(12) United States Patent
Yadav et al.

(10) Patent No.: US 9,081,910 B2
(45) Date of Patent: Jul. 14, 2015

(54) METHODS AND STRUCTURE FOR FAST CONTEXT SWITCHING AMONG A PLURALITY OF EXPANDERS IN A SERIAL ATTACHED SCSI DOMAIN

(71) Applicant: LSI CORPORATION, San Jose, CA (US)

(72) Inventors: Nishant Kumar Yadav, Bangalore (IN); Ankit Goel, Bangalore (IN); Anjali Yadav, Meerut (IN)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 283 days.

(21) Appl. No.: 13/764,893

(22) Filed: Feb. 12, 2013

(65) Prior Publication Data

US 2014/0229652 A1 Aug. 14, 2014

(51) Int. Cl.
G06F 13/00 (2006.01)
G06F 13/40 (2006.01)

(52) U.S. Cl.
CPC .................................. G06F 13/4022 (2013.01)

(58) Field of Classification Search
CPC . G06F 3/0689; G06F 13/4022; G06F 3/0635; G06F 3/067
USPC ........................................................ 710/316
See application file for complete search history.

(56) References Cited

U.S. PATENT DOCUMENTS

| 8,127,059 | B1 * | 2/2012 | Carr et al. ........................ 710/74 |
| 8,626,981 | B1 * | 1/2014 | Roberts et al. ................ 710/316 |
| 2005/0071532 | A1 * | 3/2005 | Bakke et al. ................... 710/300 |
| 2007/0226757 | A1 * | 9/2007 | Bashford et al. .............. 719/326 |
| 2008/0162773 | A1 * | 7/2008 | Clegg et al. .................... 710/316 |
| 2010/0064085 | A1 | 3/2010 | Johnson et al. |
| 2010/0153639 | A1 * | 6/2010 | Corry et al. .................... 711/113 |
| 2011/0138097 | A1 * | 6/2011 | Nakajima et al. ............. 710/316 |
| 2011/0145452 | A1 * | 6/2011 | Schilling et al. ................ 710/74 |
| 2012/0331181 | A1 * | 12/2012 | Govande et al. ................... 710/8 |
| 2014/0115418 | A1 * | 4/2014 | Raghavan et al. ............. 714/758 |
| 2014/0136739 | A1 * | 5/2014 | More et al. ..................... 710/105 |
| 2014/0143472 | A1 * | 5/2014 | More et al. ..................... 710/316 |

* cited by examiner

*Primary Examiner* — Faisal M Zaman
(74) *Attorney, Agent, or Firm* — Duft Bornsen & Fettig (57) ABSTRACT

Methods and structure for enabling Fast Context Switching (FCS) among a plurality of FCS enhanced Serial Attached SCSI (SAS) expanders of a SAS domain. The FCS enhanced SAS expander is further adapted to detect completion of utilization of the first connection that utilizes an upstream PHY and a downstream PHY of the expander. The expander is further adapted, responsive to detecting completion, to determine whether a second connection between the initiator device and a second target device could be established utilizing the existing coupling between the upstream PHY and the downstream PHY. The expander de-couples the upstream PHY from the downstream PHY within the expander in response to determining that the second connection does not utilize the existing coupling and maintains the existing coupling in response to determining that the second connection utilizes the coupling between the upstream PHY and the downstream PHY.

20 Claims, 12 Drawing Sheets

METHODS AND STRUCTURE FOR FAST CONTEXT SWITCHING AMONG A PLURALITY OF EXPANDERS IN A SERIAL ATTACHED SCSI DOMAIN

BACKGROUND

1. Field of the Invention

The invention relates generally to Serial Attached SCSI (SAS) expanders and more specifically relates to methods and structures for enabling Fast Context Switching (FCS) between a SAS initiator device and a plurality of SAS target devices coupled with multiple SAS expanders in a SAS domain.

2. Discussion of Related Art

In a SAS environment, SAS initiators are coupled with one or more target devices through intermediate SAS expanders. The target devices may be SAS targets or Serial Advanced Technology Attachment (SATA) targets. In general, the collection of SAS expanders between the initiators and targets is referred to as a SAS Service Delivery Subsystem (SDS).

When a SAS initiator contacts a SAS target device, an open connection is initially established by a SAS initiator transmitting an Open Address Frame (OAF) through the SDS and receiving an acceptance (OPEN_ACCEPT primitive) from the identified SAS target device. The open request and acceptance are routed and passed through each SAS expander between the initiator and target. Once a connection is established, physical links (PHYs) used for the connection by SAS expanders between the initiator and target devices act in a "pass-through" mode until the connection is closed by the initiator. Once an expander senses that a previously established connection has been closed, it awaits receipt of a next OAF to establish another connection.

Similarly, when an STP initiator establishes a connection with a SATA target, the STP initiator transmits an OAF to the SATA target. The SAS expander that is directly coupled with the identified SATA target device (e.g., the "end expander") responds with an OPEN_ACCEPT on behalf of the identified SATA target device to thus establish the desired connection through the SDS.

When establishing a connection, SAS expanders which PHYs of the expander will be used. The PHYs are then coupled with one another by a switching circuit. When the SAS expander detects closure of a previously established connection, the coupled PHYs used for that connection are released to allow them to service other connections.

Existing enhancements to the SAS protocols to allow connections between a single initiator and multiple SAS target devices to remain open or established so that switching between connections may be performed without "tearing down" all resources used in an established connection. LSI Corporation refers to such systems as Fast Context Switching (FCS) systems. An FCS capable SAS expander that is directly coupled to multiple SAS target devices can detect receipt of a new form of SAS frame that requests a Fast Context Switch from the currently utilized connection to another previously established connection that has not been completely closed. Thus, multiple established connections may remain open between a single SAS initiator and multiple SAS target devices. A new SAS frame (e.g., a SWITCH Address Frame—"SAF") may be used to switch between previously established connections without incurring the overhead of "tearing down" and "setting up" each connection sequentially.

SUMMARY

The present invention solves the above and other problems, thereby advancing the state of the useful arts, by providing methods and structure to enable Fast Context Switching among a plurality of enhanced SAS expanders of a SAS domain.

In aspects hereof, a computer readable medium embodying a method and the method itself is provided. The method is operable in a Fast Context Switch (FCS) enhanced Serial Attached SCSI (SAS) expander. The FCS enhanced SAS expander is adapted to couple with an initiator device and adapted to couple with one or more other FCS enhanced SAS expanders. The method comprises establishing a first connection between an initiator device and a first target device. The first connection comprises coupling an upstream physical link (PHY) of the expander with a downstream PHY of the expander. The first connection utilizes the upstream physical link (PHY) for coupling with the initiator device and utilizes the downstream PHY for coupling with the first target device. The method further comprises detecting completion of utilization of the first connection. Responsive to detecting completion, the method determines whether a second connection between the initiator device and a second target device could be established utilizing the coupling between the upstream PHY and the downstream PHY. The method decouples the upstream PHY from the downstream PHY in response to determining that the second connection does not utilize the coupling between upstream PHY and the downstream PHY. The method maintains the coupling within the expander between the upstream PHY and the downstream PHY for utilization in the second connection in response to determining that the second connection utilizes the coupling between the upstream PHY and the downstream PHY.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
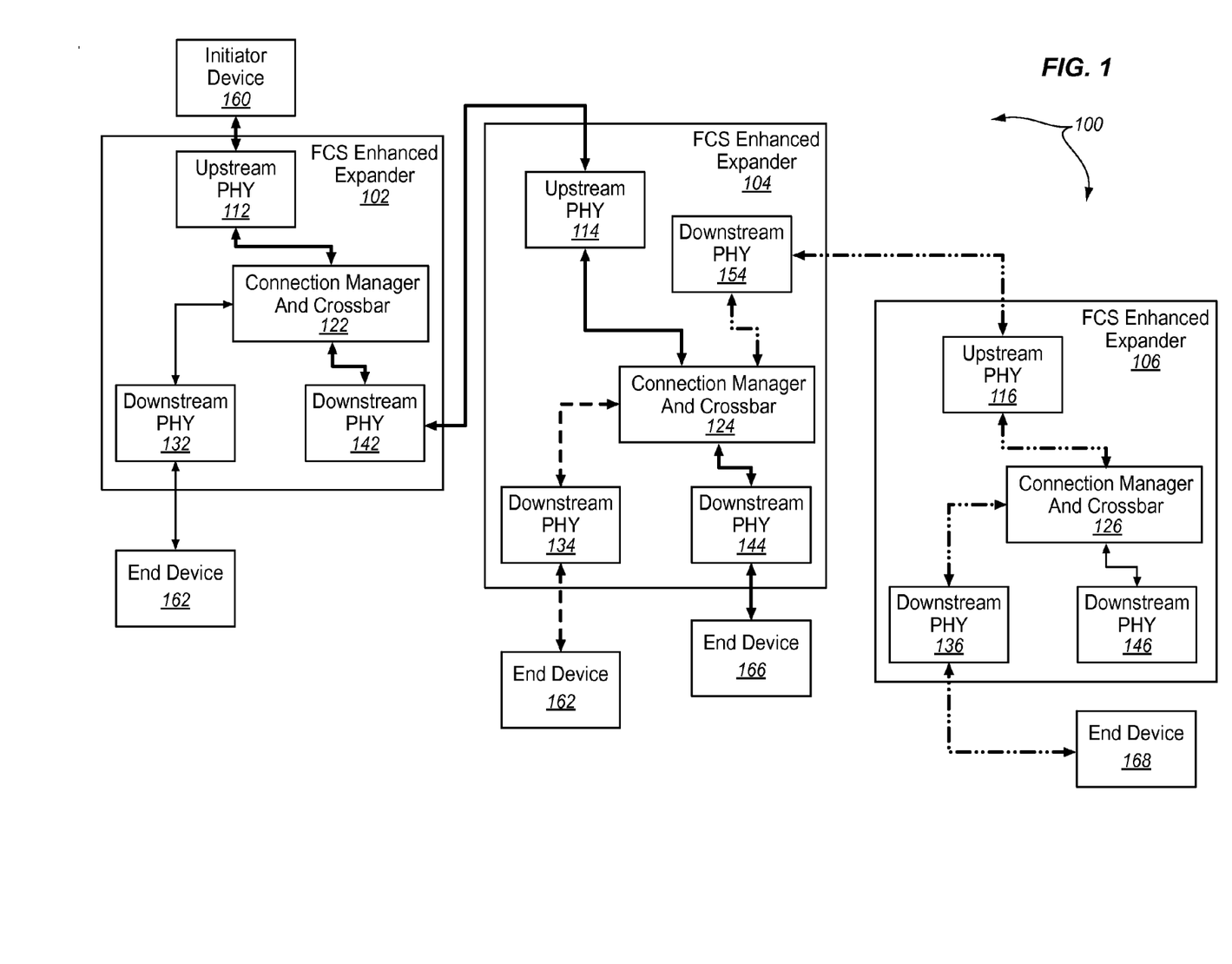
FIG. 1 is a block diagram of an exemplary system comprising multiple SAS expanders enhanced to enable Fast Context Switching (FCS) among the plurality of expanders in accordance with features and aspects hereof.

FIG. 1 is a block diagram of a system 100 comprising a plurality of FCS enhanced expanders 102, 104, and 106. The expanders enable FCS among a plurality of coupled end devices (initiators and targets). Each expander includes at least one upstream physical link and associated logic (PHY) and one or more downstream PHYs. For example, expander 102 comprises upstream PHY 112 and downstream PHYs 132 and 142, enhanced expander 104 comprises upstream PHY 114 and downstream PHYs 134, 144, and 154, and expander 106 comprises upstream PHY 116 and downstream PHYs 136 and 146.

Upstream PHY 112 of expander 102 couples expander 102 with an initiator device 160. Downstream PHY 132 of expander 102 couples the expander with end device 162. Downstream PHY 142 of expander 102 couples the expander with expander 104 via its upstream PHY 114. Downstream PHY 134 and 144 of expander 104 couple the expander with end devices 164 and 166, respectively. Downstream PHY 154 of expander 104 couples the expander with expander 106 via its upstream PHY 116. Downstream PHY 136 of expander 106 couples the expander with end device 168. Each PHY may include suitably configured logic circuits adapted to provide PHY layer control logic.

Enhanced expanders 102, 104, and 106 include connection manager and crossbar elements 122, 124, and 126, respectively. Each connection manager and crossbar element comprises circuitry that enables controllable connectivity between any pair of PHYs of an expander. In particular, each connection manager may determine which PHYs to couple with each other to service a desired connection between two devices, and may operate a crossbar switch to couple those PHYs.

In accordance with features and aspects hereof, the PHYs and the connection manager elements of each expander are enhanced to enable Fast Context Switching between any devices in the system. Thus, as compared to present Fast Context Switching features present in some LSI Corporation expanders, which limit Fast Context Switching to connections between devices that are directly coupled to the same expander, enhanced expanders 102, 104 and 106 of system 100 enable Fast Context Switching between devices coupled with any enhanced expander of the system. This multi-expander Fast Context Switching is exemplified in FIG. 1 by the multiple thicker lines representing connected pathways through the multiple expanders of the system 100. For example, a thick solid line represents a first connection coupling initiator device 160 with end device 166. Following the pathway represented by the solid thicker black line, initiator device 160 is coupled with upstream PHY 112 of expander 102. PHY 112 is coupled through connection manager and crossbar element 122 with downstream PHY 142 of expander 102 which, in turn, is directly coupled with upstream PHY 114 of expander 104. PHY 114 is coupled through connection manager and crossbar element 124 with downstream PHY 144 which is, in turn, directly coupled with end device 166.

Using system 100, Fast Context Switching may use portions of an established pathway (e.g., the pathway between initiator 160 and end device 166) to establish a different pathway between other devices (e.g., between initiator 160 and end device 162, or between initiator 160 and end device 164). The new pathway re-uses a portion of the first pathway without requiring tearing down the connection and re-acquiring associated resources.

Still another possible Fast Context Switch may be performed to swap a first connection between devices (i.e., between initiator 160 an end device 166) to a second connection between devices (i.e., between initiator 160 and end device 168), while still preserving a portion of the pathway used to service the first connection. The enhanced features of expanders 102, 104, and 106 enable Fast Context Switching among devices coupled with a plurality of enhanced expanders.

Those of ordinary skill in the art will readily recognize numerous additional and equivalent elements that may be present in a system such as system 100 and specifically may be present in enhanced expanders 102, 104, and 106. Such additional and equivalent elements are omitted herein for simplicity and brevity of this discussion. Still further, any number of enhanced PHYs within enhanced expanders may be present to allow Fast Context Switching among any number of initiator devices coupled with any of the enhanced expanders and any number of end devices coupled with any of the enhanced expanders. In general, the enhanced Fast Context Switching features and aspects hereof permit each expander to determine whether another second connection has been requested and whether such a requested second connection may utilize any of the existing couplings in the pathway used for an established first connection.

Figure 2:
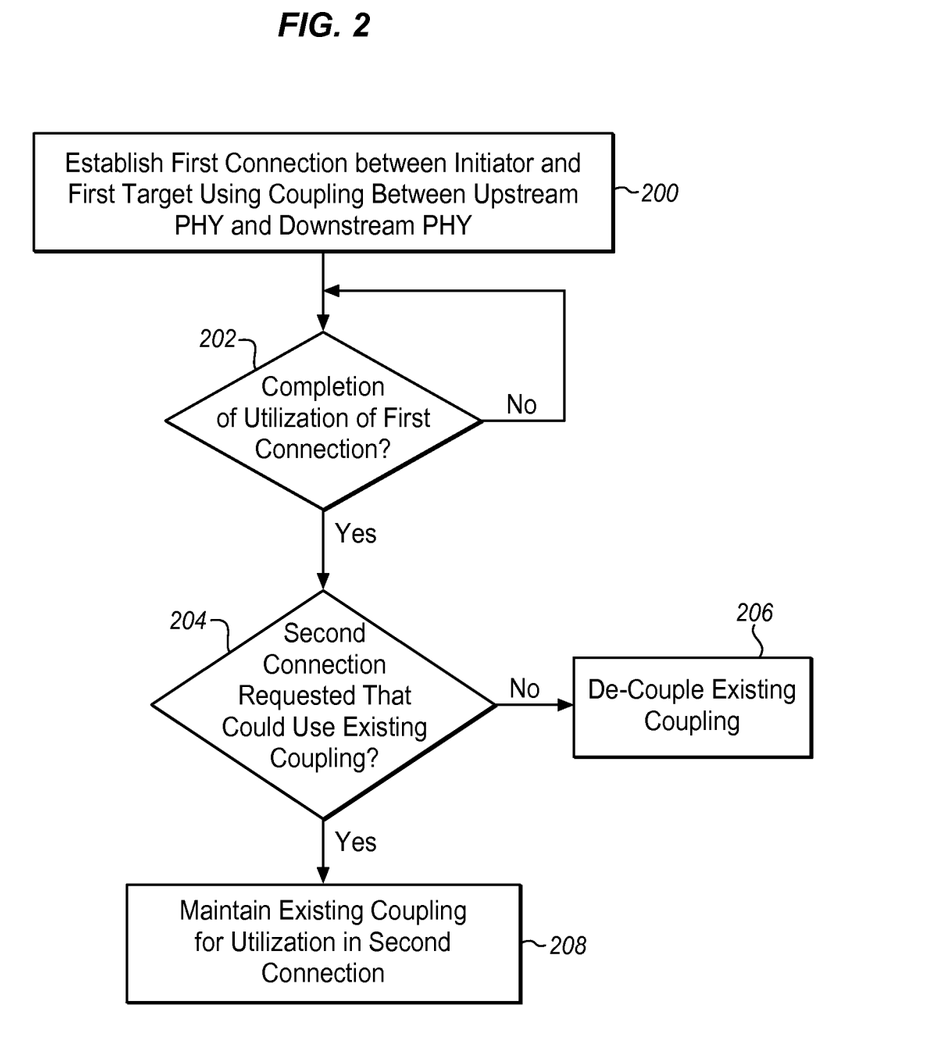
FIG. 2 is a flowchart describing an exemplary method in accordance with features and aspects hereof to enable Fast Context Switching (FCS) among a plurality of enhanced SAS expanders.

FIG. 2 is a flowchart describing an exemplary method for implementing Fast Context Switching among a plurality of enhanced expanders in accordance with features and aspects hereof. The method of FIG. 2 may be performed within a system comprising multiple enhanced expanders such as system 100 of FIG. 1 and more specifically may be performed within the enhanced connection manager and crossbar element and enhanced PHY/link logic elements of each of the multiple expanders 102, 104, and 106 of system 100 of FIG. 1. In general, each of the enhanced expanders of such an enhanced system may perform the method of FIG. 2 substantially in parallel.

At step 200, the enhanced expander is involved in establishing a first connection between an initiator and a first target device by coupling an upstream PHY of the expander to a downstream PHY of the expander. The coupling between the two PHYs is performed by the connection manager and crossbar element of the expander in accordance with routing information within the expander.

In step 202, the expander waits until it detects completion of the established first connection. This may be achieved by snooping (e.g., intercepting) SAS primitives and frames exchanged between the initiator and first target device through the upstream and downstream PHYs of the expander. For example, a SAS DONE primitive transmitted between the coupled PHYs of the expander (e.g., over the upstream PHY or downstream PHY) may indicate that communications along the first connection have come to a close.

Once the first connection is no longer being utilized, in step 204 the expander determines whether a second connection has been requested that could utilize the existing coupling of the upstream and downstream PHYs within the expander. If a second connection has been requested, but would not use the present upstream PHY and downstream PHY coupling, or if no second connection has been requested, then the expander decouples the existing coupling between the upstream and downstream PHYs in step 206 (e.g., by operation of the connection manager and crossbar element).

If a second connection has been requested that will utilize the existing coupling of the upstream and downstream PHYs, in step 208 the expander maintains the existing PHY coupling to service a second connection. In general, step 208 represents suitable processing within the expander to establish the requested second connection. In one embodiment, the expander further records information regarding the particular I_T nexus associated with the newly established second connection (i.e., identification of the initiator and the target device presently using the coupled pair of PHYs in that expander). Processing within the expander then continues with the second connection that has now been established. The newly established second connection then stands in the role of an existing first connection with respect to repeated performance of the method of FIG. 2

FIGS. 3 through 11 are flowcharts representing exemplary additional details of methods implementing Fast Context Switching among a plurality of enhanced SAS expanders. The methods of FIGS. 3 through 11 are operable in a system such as system 100 of FIG. 1. More specifically, the methods of FIGS. 3 through 11 may be operable in the enhanced PHYs of each enhanced expander of the system of FIG. 1.

FIGS. 3 through 7 represent processing within the each enhanced expander to allow a forward Fast Context Switch (e.g., processing of a "forward switch" request). In a forward switch request, once a first connection has been completed, the initiator requests a Fast Context Switch to establish a second connection with a second target device. Specifically, the initiator transmits a DONE(SWITCH) primitive indicating to the recipient that a Fast Context Switch will be forthcoming from the initiator. Upon receipt of an appropriate DONE primitive in response to the transmitted DONE (SWITCH) primitive, the initiator transmits a Switch Address Frame (SAF) to establish the desired second connection. Each enhanced expander in the system involved in the established first connection may snoop or intercept the transmitted DONE(SWITCH) primitive to prepare for the forthcoming SAF from the initiator. Since any of the enhanced expanders could be the "end expander" for the requested second connection (i.e., the expander that is directly coupled with the target device identified in the SAF), each enhanced expander involved in the first connection will snoop or intercept the transmitted SAF until the expander responsible for the identified target device (the "end expander") processes the SAF and replies to the initiator. This end expander (in conjunction with the target/end device and the initiator device) will complete establishment of the second connection. In addition, the enhanced features of the "end expander" will communicate with devices that were a part of the first connection (but are not a part of the new second connection) in order to close part of the pathway used to establish the first connection.

FIGS. 3 through 7, in combination, represent a single exemplary method signified by the various off page connectors utilized through the flowchart figures to connect the logical steps among the pages of the flowcharts. Processing starts at step 300 of FIG. 3 where an expander of the system detects receipt of an SAF or OAF from an initiator. The received frame is detected as it arrives at the upstream PHY of the expander (this frame is propagated to each enhanced expander up to and including the expander that provides the desired direct coupling with the requested end device).

Figure 3:
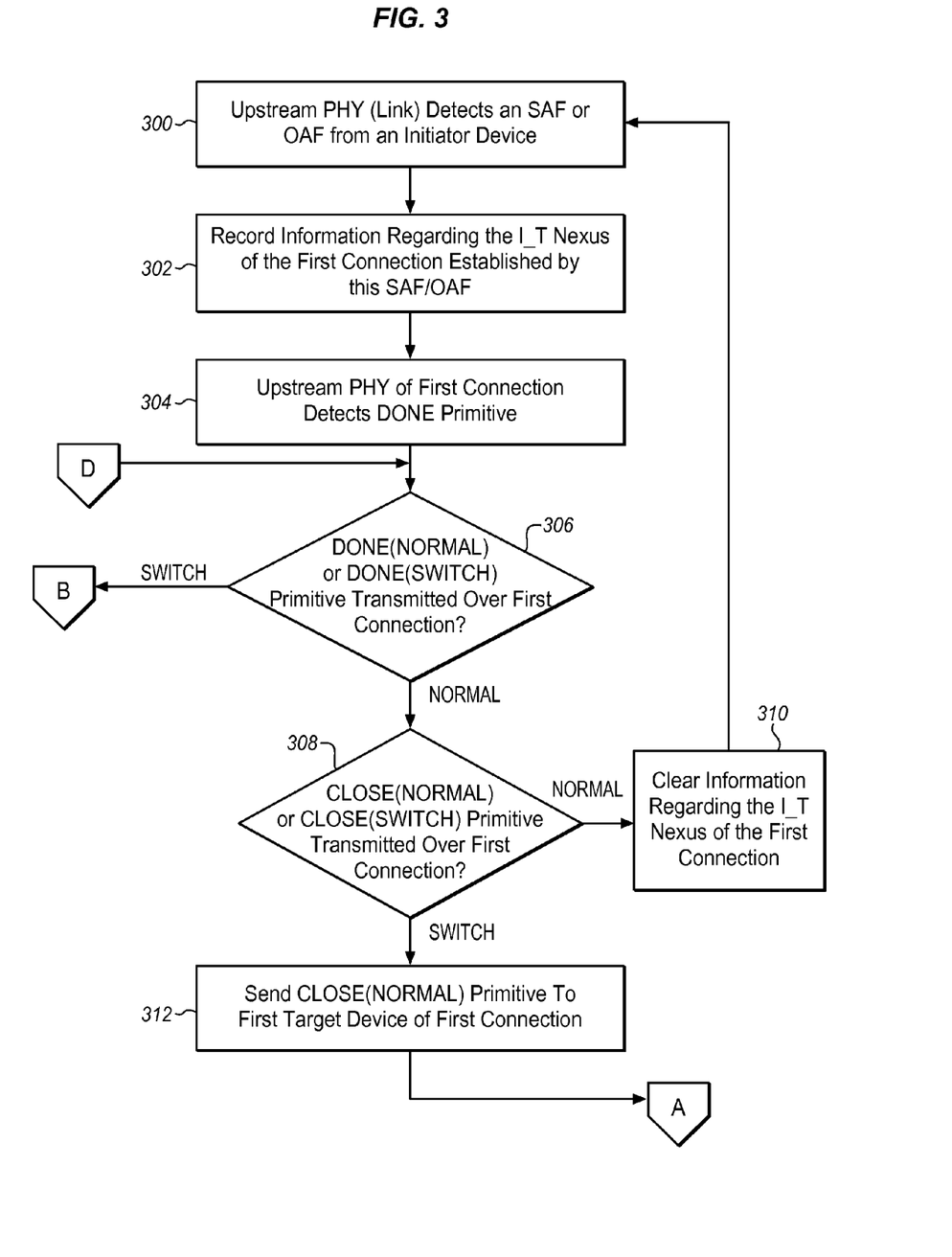
FIG. 3 through 11 are flowcharts describing exemplary methods for enabling forward and reverse fast context switching among a plurality of enhanced SAS expanders in accordance with features and aspects hereof.

At step 302, the expander (and each expander along the path, as method 300 is performed independently by each expander) records information in memory that indicates the I_T nexus of this first connection to be established. The I_T nexus information identifies the initiator and target devices involved in the requested connection. Once the connection has been established, logic within the enhanced expander snoops communication along the connection until it detects a DONE primitive being transmitted over the upstream PHY (e.g., transmitted from the initiator device) in step 304. The DONE primitive indicates that communications along the first connection have completed.

At step 306, the expander determines whether the intercepted DONE primitive was a DONE(NORMAL) primitive or a DONE(SWITCH) primitive. If the primitive was a DONE(SWITCH) primitive, the initiator device is requesting a Fast Context Switching forward switch operation to establish a second connection with a second target device. Processing in such a case continues at label B described herein below with reference to FIG. 4. If the exchanged DONE primitive was a DONE(NORMAL) primitive, in step 308 the expander determines whether a CLOSE(NORMAL) or CLOSE (SWITCH) primitive is next transmitted over the first connection (e.g., received over the downstream PHY of the expander from the target device). If a CLOSE(NORMAL) primitive was transmitted, in step 310 the expander clears the information previously stored in memory regarding the I_T nexus of the first connection since the first connection was now closed in a normal manner. The first connection is simply taken down in accordance with normal SAS operations.

Conversely, if the expander in step 308 determines that a CLOSE(SWITCH) primitive was received over the first connection (e.g., transmitted from the target to the expander while en route to the initiator), processing continues at step 312. The CLOSE(SWITCH) primitive is sent upstream until it reaches the initiator. The initiator may then send an SAF that will be intercepted by the expander coupled with the target device requested in the SAF (as described in step 402 below).

Figure 4:
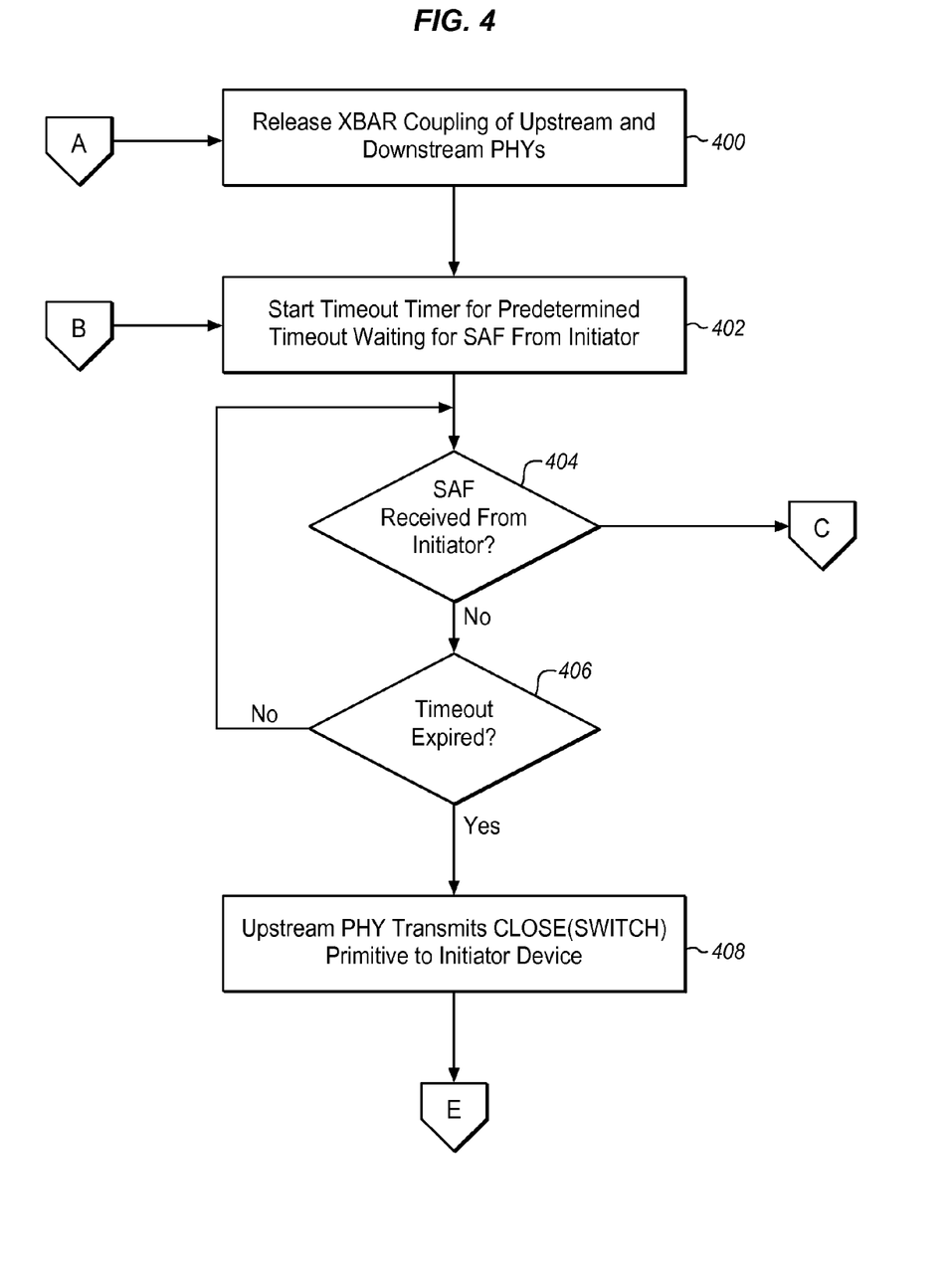

Processing continues from step 312 to label A of FIG. 4. Specifically at step 400, the expander reprograms its crossbar switch to decouple the upstream and downstream PHYs utilized in the first connection if required by the second connection. All couplings between the expander's upstream PHY and the initiator device upstream from this expander remain intact to allow the expander to make a Fast Context Switch as requested by the initiator device.

At step 402 (also entered as label B as discussed above), the expander begins waiting for a possible SAF to be received over the upstream PHY from the initiator device requesting a second connection with an identified second target device also coupled with this same expander. Since the CLOSE (SWITCH) primitive indicates that a Fast Context Switch is forthcoming (e.g., a forward switch initiated by the initiator device), the expander is awaiting a possible SAF directed to this expander device. The SAF could be directed to an end device coupled to another expander but in case it is directed to this expander, it is desirable to wait for a brief period of time before releasing resources in this expander. The waiting commences by starting a timer programmed for a predetermined timeout period. In step 404 the expander then checks whether an SAF has been received from the initiator requesting establishment of a second connection with a second target device also coupled with this expander (e.g., over the upstream PHY still coupled with the initiator device). If an SAF is received by this expander, the expander sends a CLOSE(NORMAL) primitive to other expanders that were used to established the first connection, but will not be servicing the new connection. Then processing continues at label C of FIG. 5 as described below. However, upstream connections from this expander remain intact.

Otherwise, in step 406 the expander determines whether the timeout has expired. If not, steps 404 and 406 are iteratively operable until either the timeout period has expired or until an appropriate SAF is received/snooped/intercepted from the initiator device.

Figure 5:
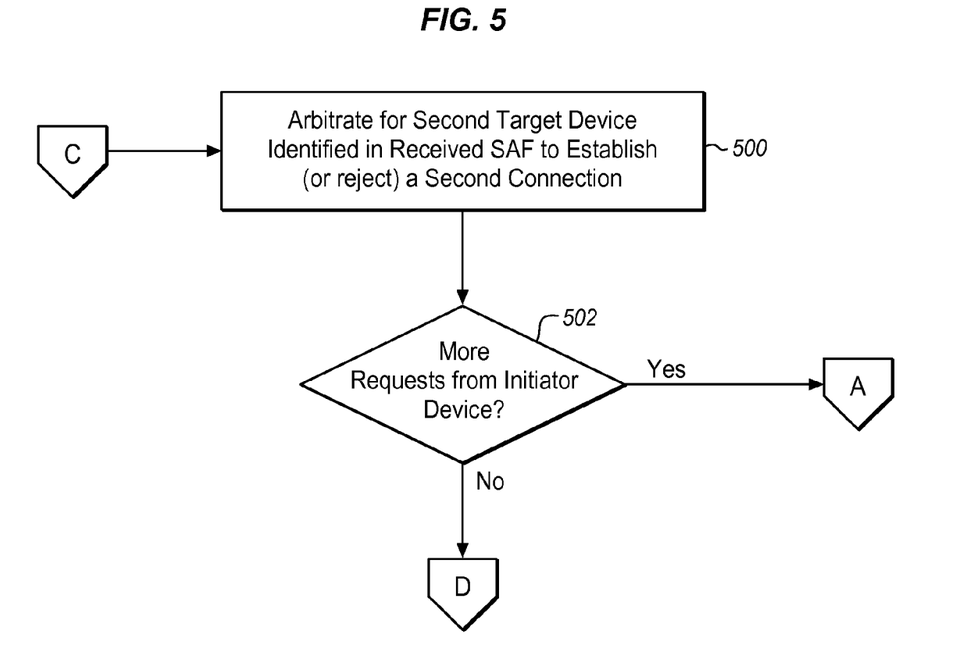

Referring for the moment to FIG. 5, if an SAF is received requesting a second connection to a second target device also coupled with the same expander, processing continues at label C of FIG. 5. At step 500, the expander arbitrates to establish the requested second connection with the second target device identified in the received SAF to thereby establish (or reject) the requested second connection. Having established or rejected the second connection, the expander in step 502 determines whether any more requests for connections at this expander may be received. If so, processing continues at label A of FIG. 4 after the present connection is no longer being used (step 400 of FIG. 4 as discussed above). If not, processing continues at label D (step 306 of FIG. 3).

Referring again to FIG. 4, if the timeout expires and no SAF has been received by the expander in step 406, the expander in step 408 transmits a CLOSE(SWITCH) primitive to the initiator device via the upstream PHY still coupled with the initiator device. The CLOSE(SWITCH) primitive indicates that the previously established first connection is completed and that the initiator may transmit an SAF to any other device on any expander without requiring closure of the remaining pathways of the established first connection. Upon receipt of such a CLOSE(SWITCH) primitive in the initiator device, the initiator will transmit an SAF identifying an end device (second target device) for which a second connection is desired through any of the expanders of the system. Processing then continues at label E (step 600 of FIG. 6).

Figure 6:
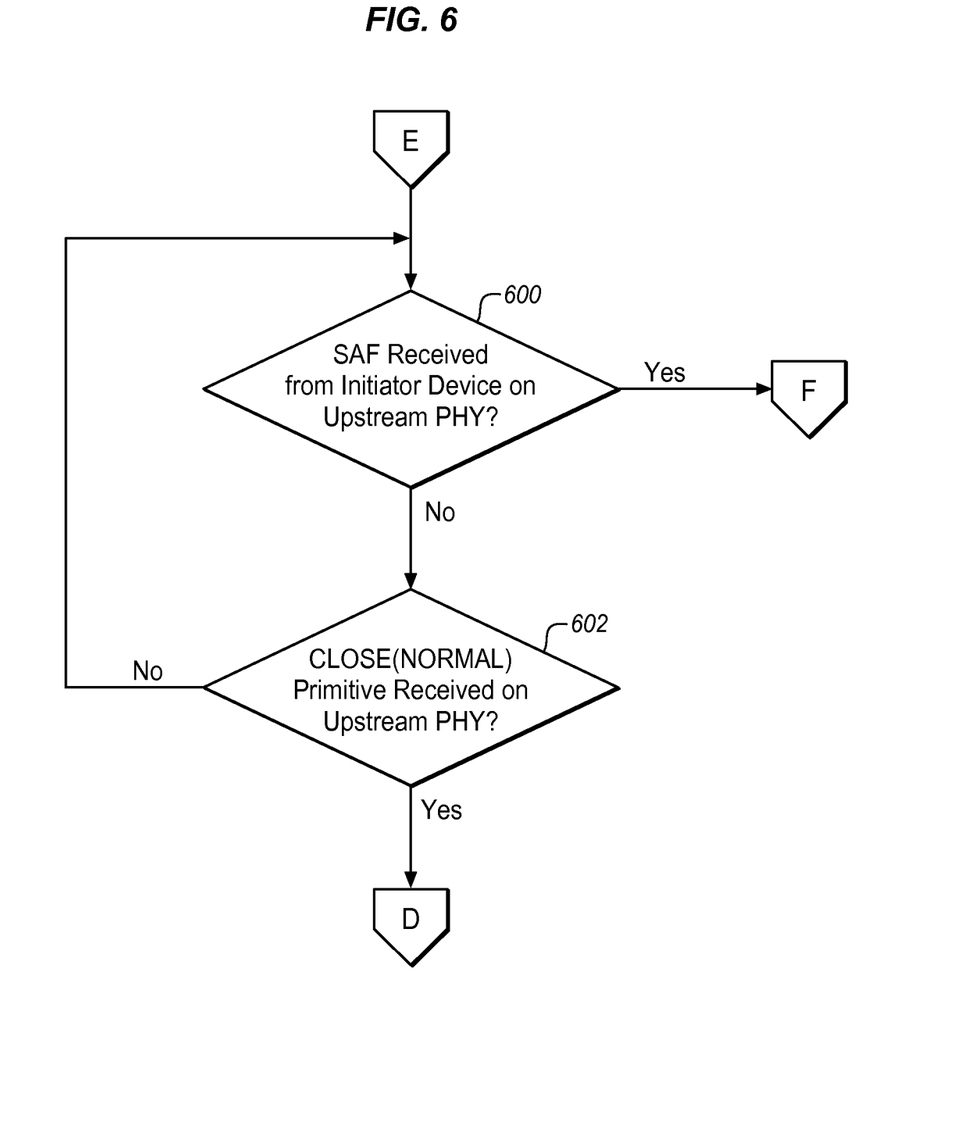

In step 600 of FIG. 6, the expander determines whether the SAF from the initiator has been received at this expander. If the SAF was requesting a connection to a second target device coupled to an expander upstream from this expander, then that SAF will be processed in that upstream expander and will not reach this expander. If an SAF was received at this expander, then the SAF is requesting a switch to a second target device that is either coupled with this expander or coupled with an expander further downstream from this expander. Processing of such a received SAF continues at label F (step 700 of FIG. 7). Otherwise, in step 602 the expander determines whether a CLOSE(NORMAL) primitive was received on this expander's upstream PHY. As discussed above, if an SAF was received and processed by an upstream expander, that expander will forward a CLOSE(NORMAL) primitive to this expander (e.g., to all expanders involved in the first connection that are downstream and that are not used for the second connection). If no CLOSE(NORMAL) is received, processing loops back to step 600 until either the expected SAF or the expected CLOSE(NORMAL) primitive is received. Responsive to receipt of the CLOSE(NORMAL) primitive (indicating a Fast Context Switch was processed in an expander upstream from this expander), processing continues at label D (step 306 of FIG. 3).

Figure 7:
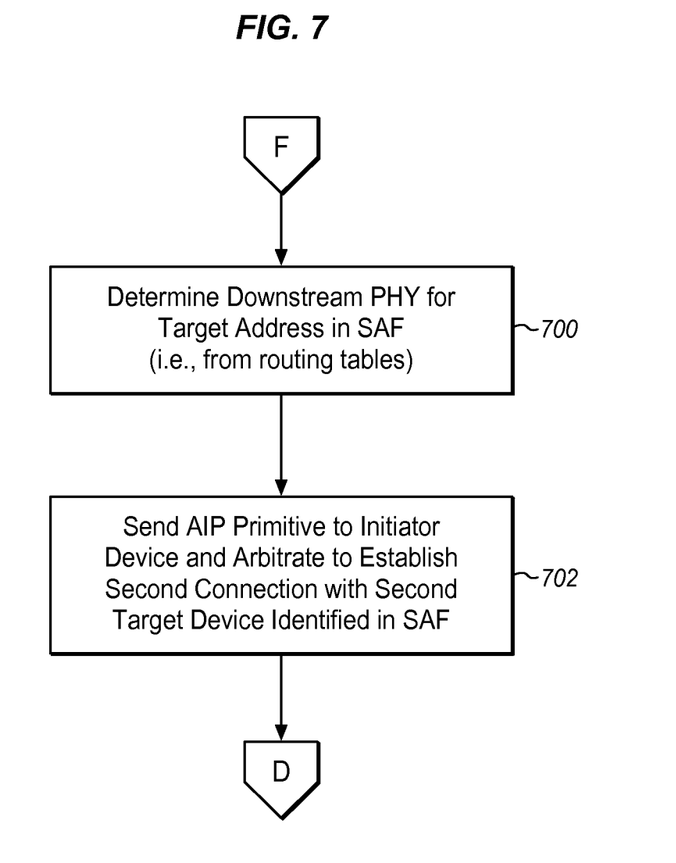

If the expander in step 600 detects receipt of an SAF, processing continues at step 700 of FIG. 7 (label F) to determine the downstream PHY for the identified target device in the SAF. Standard routing table operations in accordance with SAS standards for expanders are employed to determine the appropriate coupling between the upstream PHY of the expander that received the SAF and the downstream PHY for coupling to the end device. In step 702 the expander sends an AIP (Arbitration In Process) primitive to the initiator to inform the initiator that arbitration and other processing required to establish the requested second connection is underway. Processing then continues at label D (step 306 of FIG. 3). To service the second connection and establish communications between the initiator and the second target device.

FIGS. 8 through 11 represent processing within the each enhanced expander to allow a reverse Fast Context Switch (e.g., processing of a "reverse switch" request) among a plurality of enhanced expanders. In these figures, another end device requests a connection with the initiator. This is different from the forward switching case, where the initiator requests a connection with another end device.

Figure 8:
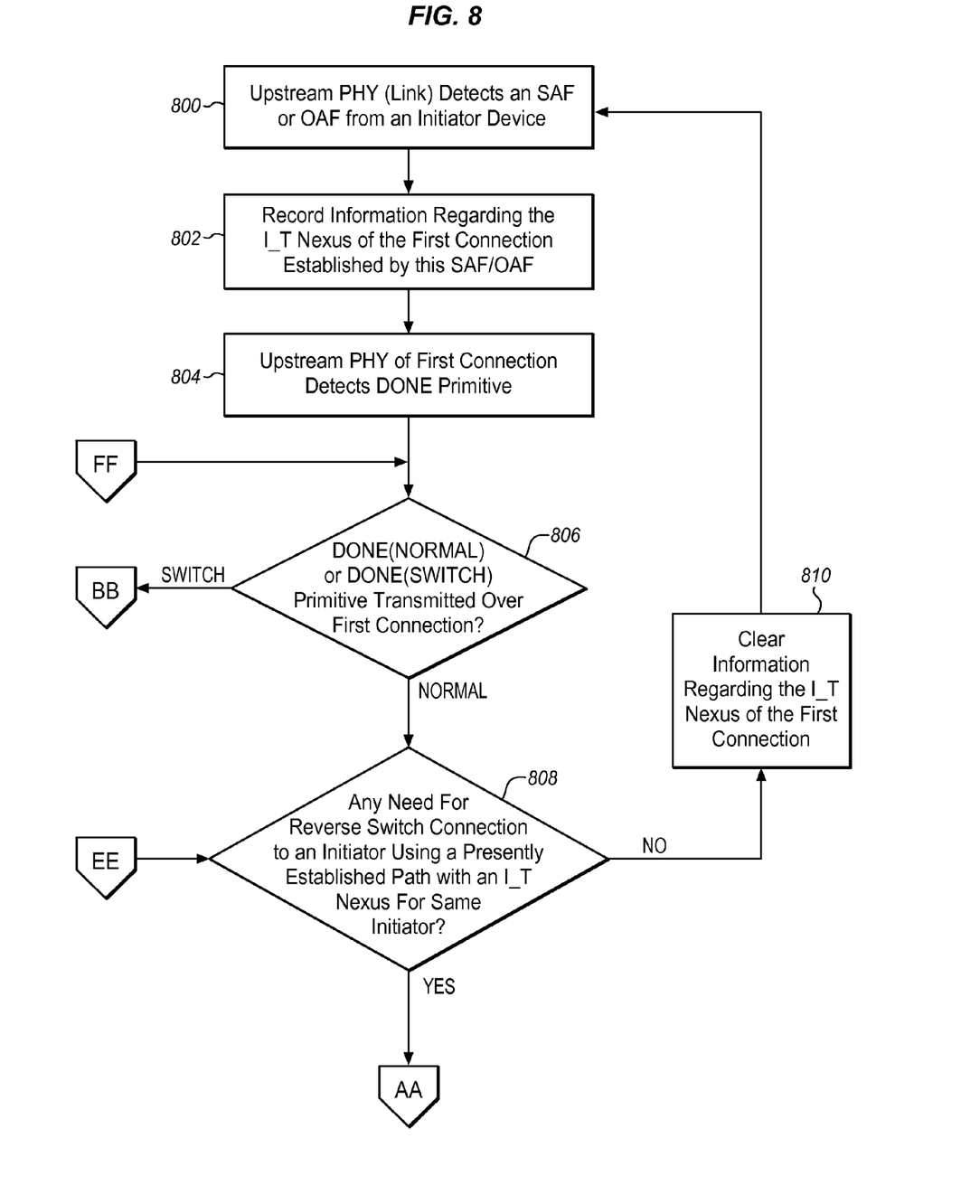

In step 800 of FIG. 8, an upstream PHY of the expander detects an SAF or OAF from an initiator that requests a first connection between an initiator and a target device. In step 802, information describing the I_T nexus of the first connection is recorded in memory of the expander. In step 804, the expander determines that its upstream PHY has received a DONE primitive. If, in step 806, the expander determines that the DONE primitive is a DONE(SWITCH), then processing continues to label BB of FIG. 10. However, if, in step 806, the DONE primitive is a DONE(NORMAL) the processing continues to step 808. In step 808, if there is an existing request for a reverse switch connection to the initiator (e.g., if there is an SAF received at the expander that has been sent from a second target device and that requests a connection with the initiator), and the connection would use at least part of a presently established pathway used to service the first connection, then processing continues to label AA of FIG. 9. If not, processing moves on to step 810. In step 810, information regarding the I_T nexus for the first connection is cleared, because it will not be used.

Figure 9:
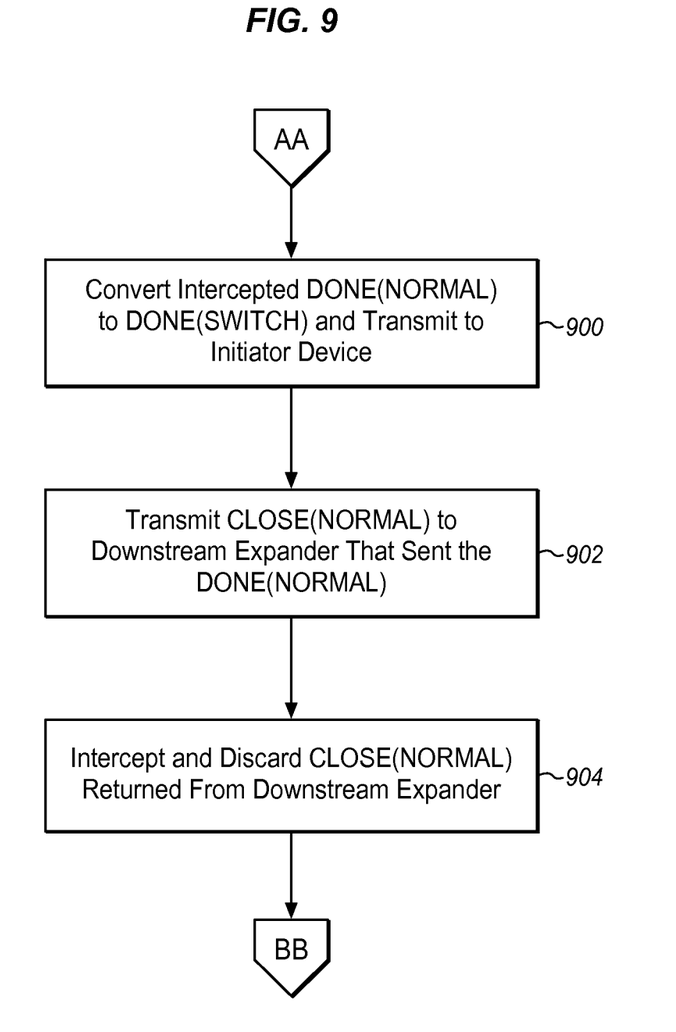

In FIG. 9, an intercepted DONE(NORMAL) primitive at the expander is converted into a DONE(SWITCH) primitive in step 900. The expander then transmits the DONE(SWITCH) primitive to the initiator device. A CLOSE(NORMAL) is then sent to the downstream expander that sent the DONE(NORMAL) in step 902. The CLOSE(NORMAL) is then returned from the downstream expander in step 904. After discarding the CLOSE(NORMAL) from the downstream expander, the current expander waits for an SAF or OAF from the target device and arbitrates for the requested connection. Further discussion is provided as processing continues to label BB of FIG. 10.

Figure 10:
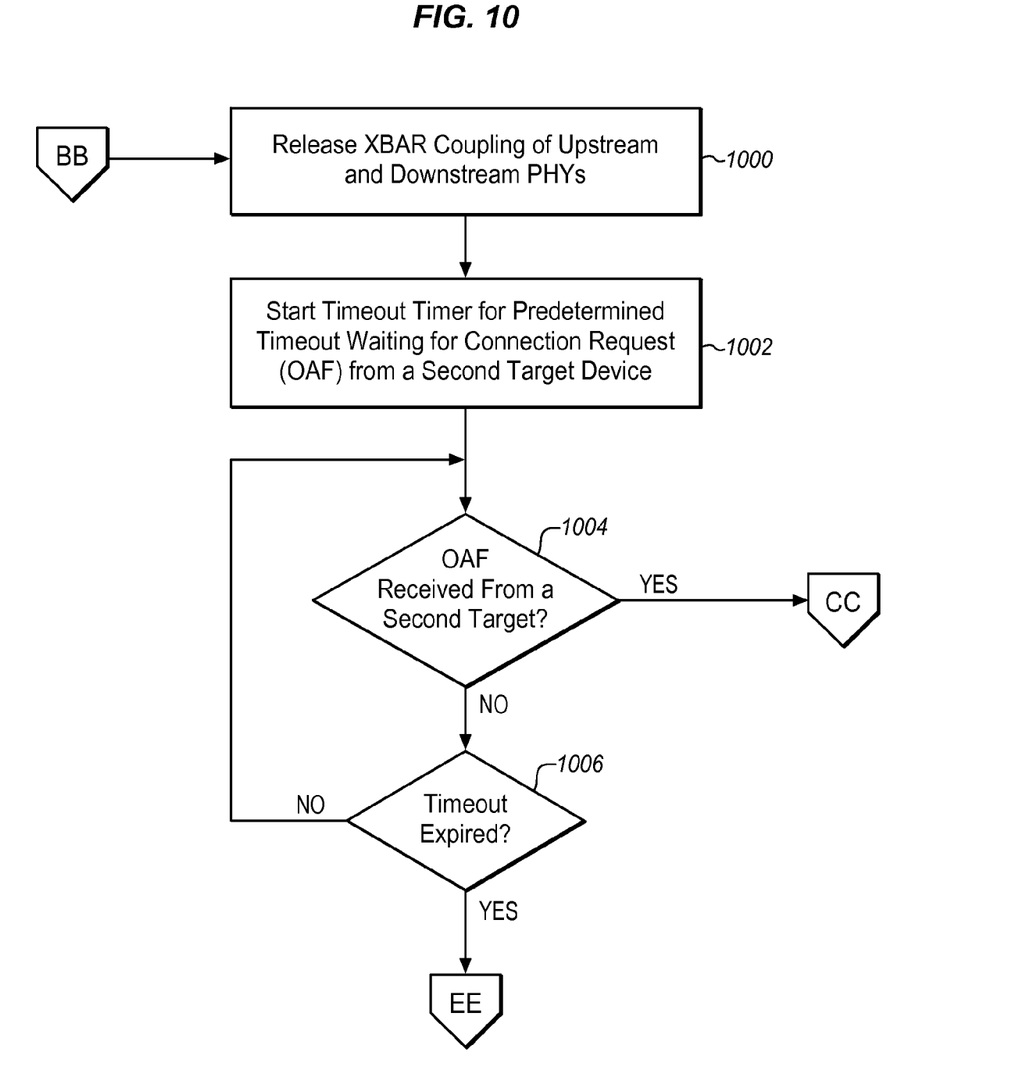

In FIG. 10, XBAR coupling of upstream and downstream PHYs is released at the expander in step 1000. The expander then starts a timeout timer while it waits for a connection request from a second target device in step 1002. In step 1004, if an OAF is received from a second target, then processing continues to label CC. Else, step 1004 loops until the timeout expires in step 1006. Should the timeout expire, then FCS will not be utilized and the connection is closed. Therefore, the expander sends a DONE(NORMAL) to the initiator, and processing follows label EE to step 808 of FIG. 8.

Figure 11:
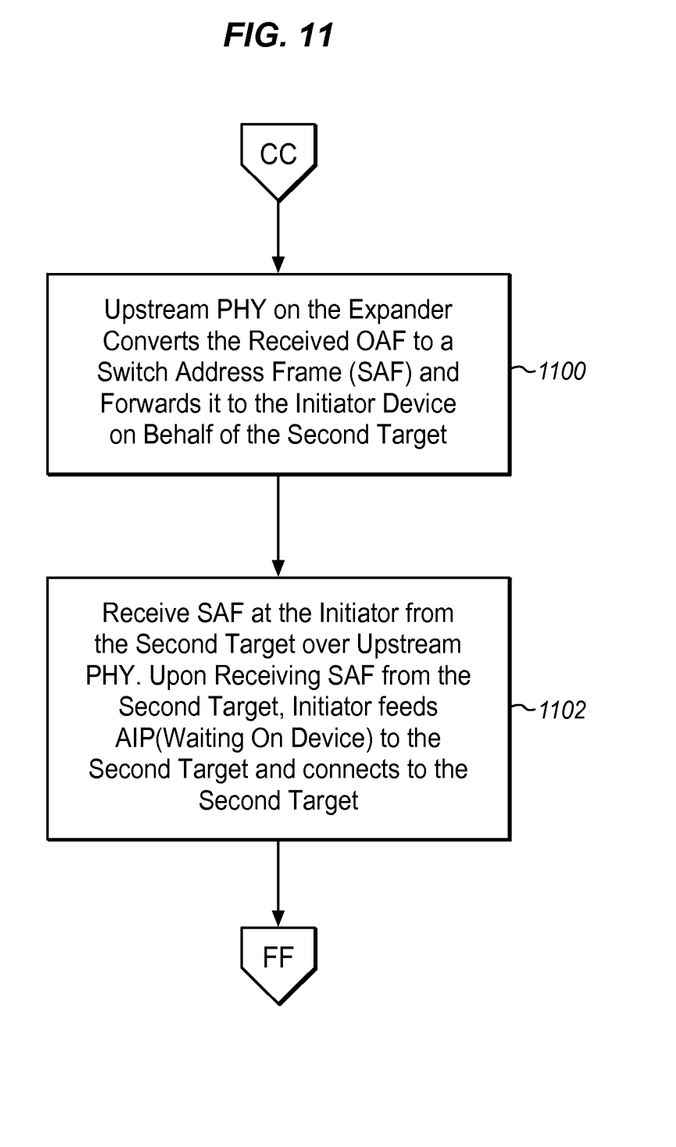

In step 1100 of FIG. 11, the upstream PHY on the expander converts the received OAF to a Switch Address Frame (SAF) and forwards it to the initiator device on behalf of the second target device. The initiator receives the SAF over the upstream PHY. Upon receiving the SAF, the initiator feeds an AIP (Waiting On Device) to the second target and connects to the second target in step 1102. Processing then follows label FF to step 806 of FIG. 8, where the current connection stands in for the first connection.

Figure 12:
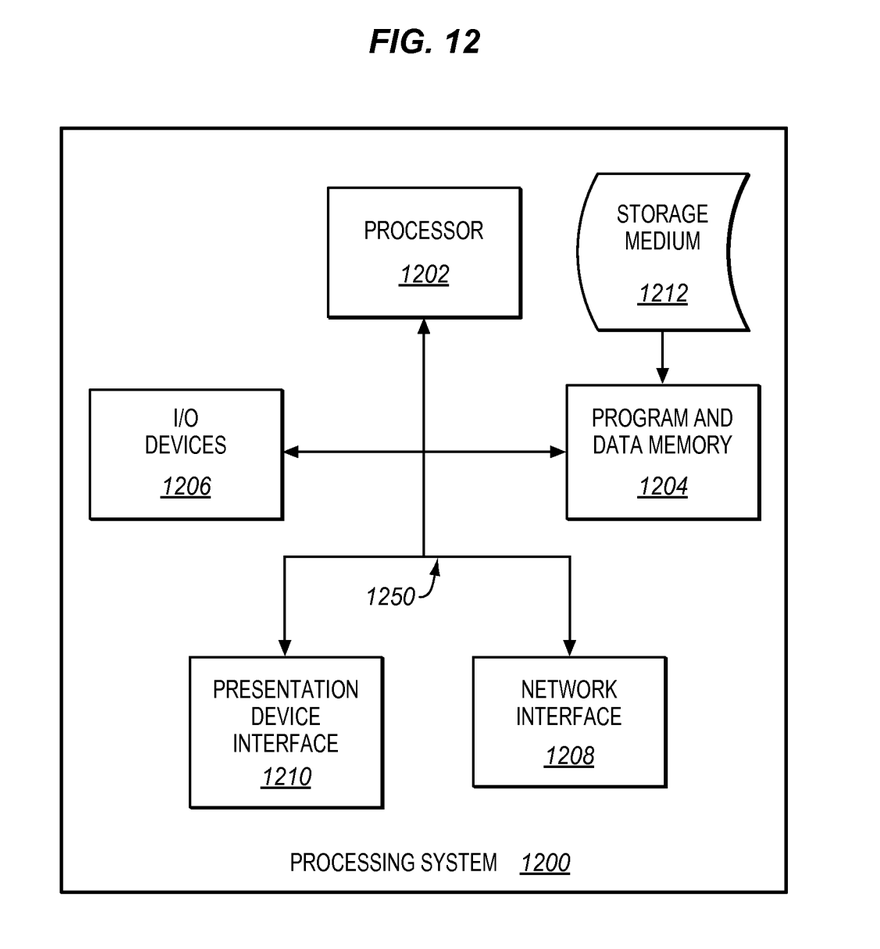
FIG. 12 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system to perform the various operations disclosed herein. FIG. 12 illustrates an exemplary processing system 1200 operable to execute a computer readable medium embodying programmed instructions. Processing system 1200 is operable to perform the above operations by executing programmed instructions tangibly embodied on computer readable storage medium 1212. In this regard, embodiments of the invention can take the form of a computer program accessible via computer readable medium 1212 providing program code for use by a computer or any other instruction execution system. For the purposes of this description, computer readable storage medium 1212 can be anything that can contain or store the program for use by the computer.

Computer readable storage medium 1212 can be an electronic, magnetic, optical, electromagnetic, infrared, or semiconductor device. Examples of computer readable storage medium 1212 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1200, being suitable for storing and/or executing the program code, includes at least one processor 1202 coupled to program and data memory 1204 through a system bus 1250. Program and data memory 1204 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1206 (including but not limited to keyboards, displays, pointing devices, etc.) can be coupled either directly or through intervening I/O controllers. Network adapter interfaces 1208 may also be integrated with the system to enable processing system 1200 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 1210 may be integrated with the system to interface to one or more presentation devices, such as printing systems and displays for presentation of presentation data generated by processor 1202.

What is claimed is:

1. A method operable in a Fast Context Switch (FCS) enhanced Serial Attached SCSI (SAS) expander, the FCS enhanced SAS expander adapted to couple with an initiator device and adapted to couple with one or more other FCS enhanced SAS expanders, the method comprising:
    establishing a first connection between an initiator device and a first target device, wherein the first connection comprises coupling an upstream physical link (PHY) of the expander with a downstream PHY of the expander and wherein the first connection utilizes the upstream physical link (PHY) for coupling with the initiator device and utilizes the downstream PHY for coupling with the first target device;
    detecting completion of utilization of the first connection;
    responsive to detecting completion, determining whether a second connection between the initiator device and a second target device could be established utilizing the coupling between the upstream PHY and the downstream PHY, based on whether a CLOSE(SWITCH) primitive is received at the expander;
    de-coupling the upstream PHY from the downstream PHY within the expander in response to determining that the second connection does not utilize the coupling between upstream PHY and the downstream PHY; and
    maintaining the coupling within the expander between the upstream PHY and the downstream PHY for utilization in the second connection in response to determining that the second connection utilizes the coupling between the upstream PHY and the downstream PHY.

2. The method of claim 1
    wherein the step of detecting completion comprises detecting exchange of DONE primitives between the initiator device and the first target device.

3. The method of claim 2
    wherein the step of detecting exchange of DONE primitives further comprises detecting transmission of a DONE(SWITCH) primitive over at least one of the upstream PHY and the downstream PHY.

4. The method of claim 2
    wherein the step of determining whether the second connection may utilize the coupling further comprises determining that the second connection will utilize the coupling by detecting transmission of a Switch Address Frame (SAF) over at least one of the upstream PHY and the downstream PHY.

5. The method of claim 2
    wherein the step of determining whether the second connection may utilize the coupling further comprises determining that the second connection will not utilize the coupling by detecting expiration of a predetermined timeout period following detecting completion during which no Switch Address Frame (SAF) is transmitted over either the upstream PHY or the downstream PHY.

6. The method of claim 2
    wherein the step of determining whether the second connection may utilize the coupling further comprises determining that the second connection will not utilize the coupling by detecting transmission of a CLOSE (SWITCH) primitive over either the upstream PHY or the downstream PHY.

7. The method of claim 1
    wherein de-coupling the upstream PHY with the downstream PHY comprises programming a crossbar switch of the expander.

8. The method of claim 1
    wherein detecting completion of utilization of the first connection comprises intercepting SAS primitives and frames exchanged between the initiator device and the first target device via the upstream PHY and the downstream PHY of the expander.

9. The method of claim 1 further comprising:
    recording information regarding an I_T nexus associated with the second connection.

10. A method operable in a Fast Context Switch (FCS) enhanced Serial Attached SCSI (SAS) expander, the FCS enhanced SAS expander adapted to couple with an initiator device and adapted to couple with one or more other FCS enhanced SAS expanders, the method comprising:
    establishing a first connection between an initiator device and a first target device, wherein the first connection comprises coupling an upstream physical link (PHY) of the expander with a downstream PHY of the expander and wherein the first connection utilizes the upstream physical link (PHY) for coupling with the initiator device and utilizes the downstream PHY for coupling with the first target device;
    detecting transmission of a DONE(SWITCH) primitive over the first connection wherein the DONE(SWITCH) primitive indicates completion of utilization of the first connection;
    detecting a transmission of a CLOSE(SWITCH) primitive over the upstream PHY from the initiator device; and
    responsive to detecting transmission of the CLOSE (SWITCH) primitive, performing the additional steps of:
        transmitting a CLOSE(NORMAL) primitive to the first target device;

receiving a CLOSE(NORMAL) primitive from the first target device;

discarding the CLOSE(NORMAL) primitive received from the first target device;

de-coupling the coupling between the upstream PHY and the downstream PHY;

awaiting either of: receipt of a Switch Address Frame (SAF) from the initiator device or expiration of a predetermined timeout period without receipt of an SAF from the initiator device;

responsive to receipt of the SAF, establishing a second connection between the initiator device and a second target device coupled with the expander wherein the second connection comprises coupling the upstream PHY with another downstream PHY of the expander and wherein the second connection utilizes the upstream PHY for coupling with the initiator device and utilizes said another downstream PHY for coupling with the second target device; and responsive to expiration of the predetermined timeout period, performing the additional steps of:

transmitting a CLOSE(SWITCH) primitive to the initiator device;

awaiting either of: receipt of an SAF from the initiator device or receipt of a second CLOSE(NORMAL) primitive on the upstream PHY;

responsive to receipt of the second CLOSE(NORMAL) primitive, transmitting a CLOSE(NORMAL) primitive to the initiator device over the upstream PHY; and responsive to receipt of the SAF, performing the additional steps of:

transmitting an Arbitration In Process (AIP) primitive to the initiator device;

establishing a second connection between the initiator device and a second target device by coupling the upstream PHY with another downstream PHY based on the SAF wherein the second connection utilizes the upstream PHY for coupling with the initiator device and utilizes said another downstream PHY for coupling with the second target device; and transmitting an Open Address Frame (OAF) to the second target device.

11. The method of claim 10 wherein de-coupling the upstream PHY with the downstream PHY comprises programming a crossbar switch of the expander.

12. The method of claim 10 recording information regarding an I_T nexus associated with the second connection.

13. A non-transitory computer readable medium tangibly embodying programmed instructions which, when executed by a suitable computing device, perform a method operable in a Fast Context Switch (FCS) enhanced Serial Attached SCSI (SAS) expander, the FCS enhanced SAS expander adapted to couple with an initiator device and adapted to couple with one or more other FCS enhanced SAS expanders, the method comprising:

establishing a first connection between an initiator device and a first target device, wherein the first connection comprises coupling an upstream physical link (PHY) of the expander with a downstream PHY of the expander and wherein the first connection utilizes the upstream physical link (PHY) for coupling with the initiator device and utilizes the downstream PHY for coupling with the first target device;

detecting completion of utilization of the first connection;

responsive to detecting completion, determining whether a second connection between the initiator device and a second target device could be established utilizing the coupling between the upstream PHY and the downstream PHY, based on whether a CLOSE(SWITCH) primitive is received at the expander;

de-coupling the upstream PHY from the downstream PHY within the expander in response to determining that the second connection does not utilize the coupling between upstream PHY and the downstream PHY; and maintaining the coupling within the expander between the upstream PHY and the downstream PHY for utilization in the second connection in response to determining that the second connection utilizes the coupling between the upstream PHY and the downstream PHY.

14. The medium of claim 13 wherein the method step of detecting completion comprises detecting exchange of DONE primitives between the initiator device and the first target device.

15. The medium of claim 13 wherein the method step of detecting exchange of DONE primitives further comprises detecting transmission of a DONE(SWITCH) primitive over at least one of the upstream PHY and the downstream PHY.

16. The medium of claim 13 wherein the method step of determining whether the second connection may utilize the coupling further comprises determining that the second connection will utilize the coupling by detecting transmission of a Switch Address Frame (SAF) over at least one of the upstream PHY and the downstream PHY.

17. The medium of claim 13 wherein the method step of determining whether the second connection may utilize the coupling further comprises determining that the second connection will not utilize the coupling by detecting expiration of a predetermined timeout period following detecting completion during which no Switch Address Frame (SAF) is transmitted over either the upstream PHY or the downstream PHY.

18. The medium of claim 13 wherein the method step of determining whether the second connection may utilize the coupling further comprises determining that the second connection will not utilize the coupling by detecting transmission of a CLOSE(SWITCH) primitive over either the upstream PHY or the downstream PHY.

19. The medium of claim 13 wherein de-coupling the upstream PHY with the downstream PHY comprises programming a crossbar switch of the expander.

20. The medium of claim 13 wherein detecting completion of utilization of the first connection comprises intercepting SAS primitives and frames exchanged between the initiator device and the first target device via the upstream PHY and the downstream PHY of the expander.

* * * * *